United States Patent [19]

Setrin

[11] 4,071,828

[45] Jan. 31, 1978

[54] SELF SYNCHRONIZING CONVOLVER SYSTEM

[75] Inventor: Morton Setrin, Rome, N.Y.

[73] Assignee: The United States of America as represented by the Secretary of the Air Force, Washington, D.C.

[21] Appl. No.: 687,581

[22] Filed: May 18, 1976

[51] Int. Cl.² .............................................. H04B 15/00
[52] U.S. Cl. .............................. 325/65; 343/100 CL; 364/821
[58] Field of Search ........................... 325/56, 58, 65; 235/181; 343/100 CL

[56] References Cited

U.S. PATENT DOCUMENTS

| 3,760,172 | 9/1973 | Quate | 235/181 |
| 3,925,653 | 12/1975 | Otto | 235/181 |
| 3,955,197 | 5/1976 | Gutleber et al. | 235/181 |

Primary Examiner—Benedict V. Safourek
Assistant Examiner—Jin F. Ng
Attorney, Agent, or Firm—Joseph E. Rusz; George Fine

[57] ABSTRACT

A self synchronizing convolver system includes a surface acoustic wave convolver excited by an appropriate reference such as an even function waveform so that the reference waveform is combined with the signal waveform in a manner yielding the complete correlation function independent of the time of arrival of the signal thereby permitting asynchronous operation.

1 Claim, 3 Drawing Figures

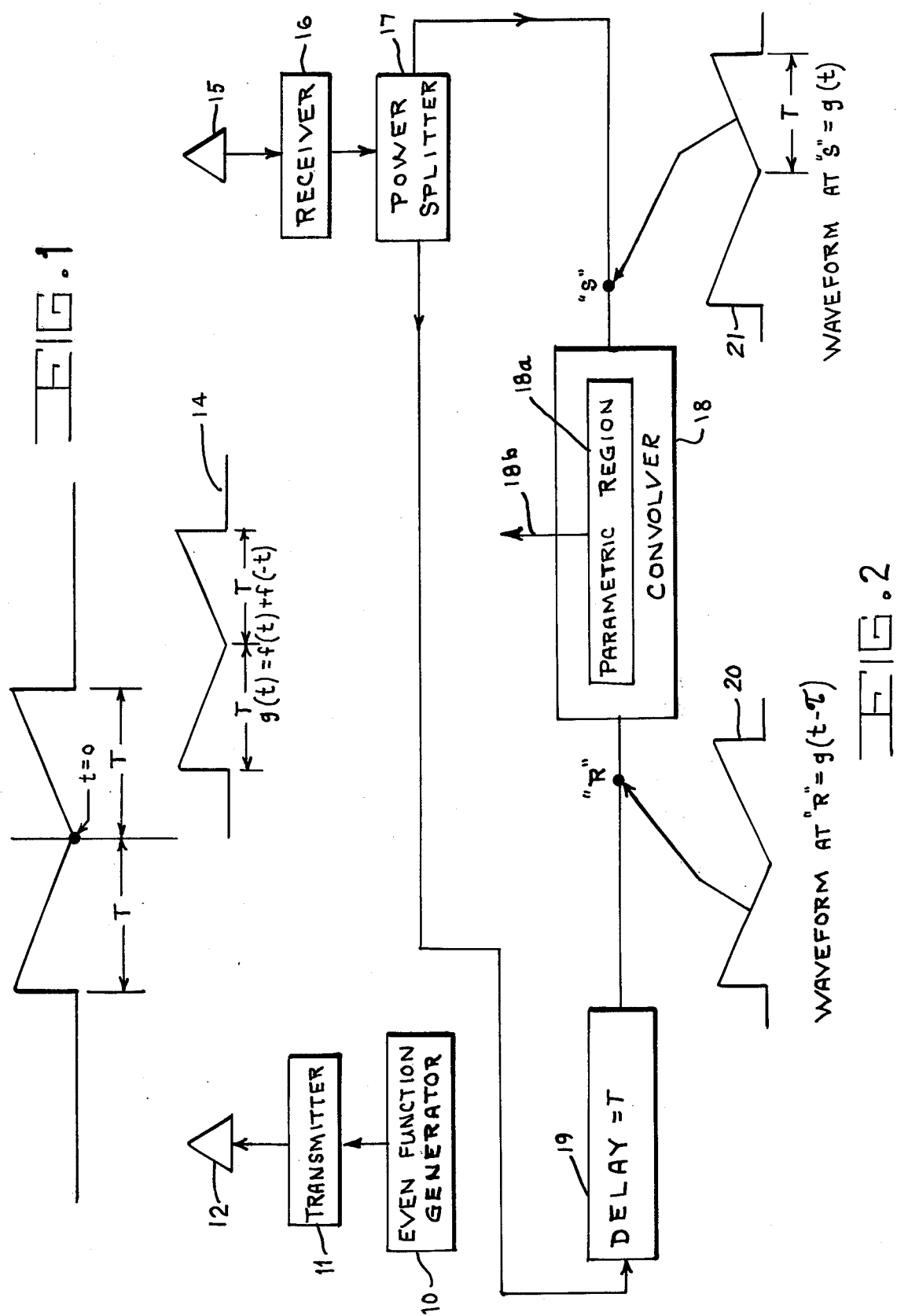

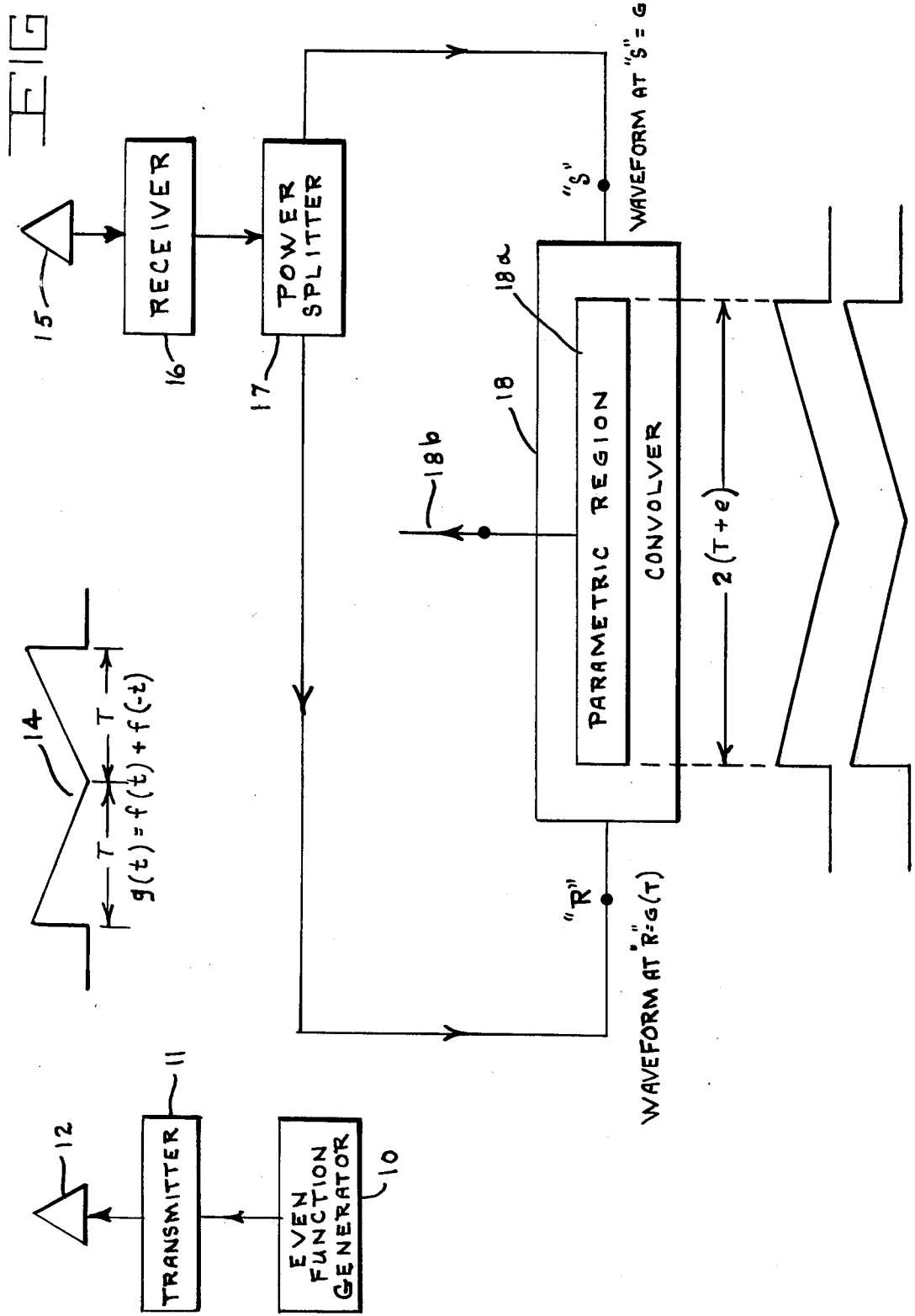

SELF SYNCHRONIZING CONVOLVER SYSTEM

STATEMENT OF GOVERNMENT INTEREST

The invention described herein may be manufactured and used by or for the Government for governmental purposes without the payment of any royalty thereon.

BACKGROUND OF THE INVENTION

A surface acoustic wave convolver, excited by an appropriate reference, can correlate a signal waveform only if the signal arrives within a small time interval such that the signal and the dynamic reference simultaneously pass one another within the parametric region of the device. The concept described herein demonstrates that the reference waveform can be combined with the signal waveform in a manner to yield the complete correlation function independent of the time of arrival of the signal, thereby permitting asynchronous operation. Doppler components are automatically rejected with no compromise to the desired correlation.

The self synchronizing convolver system may be utilized, for example, in spread spectrum radars, coherent repeaters, and in spread spectrum communications. It efficiently permits asynchronous operation. It also permits a relatively economical correlator to be developed. In its simplest form, only two input ports and one output port are required.

SUMMARY OF THE INVENTION

A self synchronizing convolver system is provided. An even function waveform is utilized to excite a surface wave convolver so that a reference waveform is combined with a signal waveform in a manner to yield the complete correlation function independent of the time of arrival of the signal. A radiant energy system is utilized in which an even function generator modulates a transmitter for transmission by way of an antenna for a preselected purpose. A receiver including an antenna receives resultant radiant energy which may be in the form of reflection energy. The received function is power split into two channels, one of which is delayed by one-half the function length. The delayed signal is fed to one side of a surface wave convolver and the undelayed signal is fed to the other side of the surface wave convolver. The output signal is then provided by way of the parametric region of the convolver.

DESCRIPTION OF THE DRAWINGS

FIG. 1 illustrates an even function waveform utilized in the preferred embodiment; and FIG. 2 shows in block diagram for a preferred embodiment of the invention including associated waveforms; and FIG. 3 shows a second embodiment.

DETAILED DESCRIPTION OF THE PREFERRED EMBODIMENTS

Even functions by definition are symmetrical about the "$y$" (amplitude) axis where $f(t) = f(-t)$, e.g. When a function such as illustrated in FIG. 1 is viewed from left to right over the interval $-T$ to $t=0$, what is seen is the time inverse of the function $f(t)$ over the interval $t = 0$ to $+T$. If the function is power split into two channels, one of which is delayed by one half the function length, then asynchronous convolution is possible.

Referring to FIG. 2, even function generator 10 modulates transmitter 11 which feeds antenna 12. There is shown even function waveform 14 represented by the equation $g(t) = f(t) + f(-t)$. The resultant radiant energy from the transmission is received by antenna 15 and fed by way of receiver 16 to power splitter 17. From power splitter 17 two channels are provided, one of which is connected directly to input S of convolver 18 and the other includes preselected delay 19 prior to connection to input R of convolver 18. Convolver 18 is shown with parametric region 18a and output line 18b. Convolver 18 is a conventional parametric surface wave convolver and may be of the type having two input signals introduced at opposite ends of an acoustic wave propagation medium. Input R of convolver 18 is shown with associated reference waveform 20, the term therefor being $g(t-T)$. Input S of convolver 18 is shown with associated signal waveform 21, the term therefor being $g(t)$.

FIG. 2 illustrates how any even function can be used to satisfy the input requirements of a convolver for arbitrary time of arrival of the signal; in effect, the signal carries its own reference. As a minimum, parametric region 18a of convolver 18 must encompass a time interval of $(T + e)$, where the value of $e$ is determined by the maximum doppler velocity expected.

There can be envisioned a family of wideband pseudorandom phase coded burst sequences, each of which over an interval T, has desirable autocorrelation properties where peak to side-lobe ratios are at least 18 db. If any sequence is preceded by its time inverse an even function will be generated permitting correlation by convolution as shown in FIG. 2. Other systems can be envisioned if a gap or dead spot is permitted after transmission of the time inverse. This would require a variable length delay line. At the receiver the signal is delayed (a prior knowledge is required) just long enough to time synchronize the two inputs of the convolver. In a radar application, range ambiguities (two or more targets separated by range intervals of T) can be resolved by the aforementioned method.

Thus, there is shown how any arbitrary function, immediately preceded by its time inverse, becomes a new function $g(t)$ which is "even". It should be noted that the total function $g(t)$ will correlate over an interval $2T$. This requires the parametric region of the convolver to encompass a time interval of $(2T + e)$.

FIG. 2 shows how an arbitrary burst function $f(t)$ preceded by its time inverse can be transmitted as a functioning ($t$) where $g(t)$ can be viewed as a composite waveform containing a reference waveform followed by a signal waveform each having a duration $T$. The receiver, by employing a delay line of length $\approx T$, permits the refernce waveform to be stored until the signal waveform arrives. This enables both the reference and signal inputs of the convolver to be excited simultaneously, thus permitting asynchronous operation. In this configuration, while the signal waveform is correlated only one half of the transmitted energy is utilized. The real time reference energy is discarded.

Close examination of $g(t)$ reveals the fact that the waveform seen along the time axis for increasing values of $t$ from $(t - T)$ to $(t + T)$ is identical to the waveform seen for decreasing values of $t$ from $(t + T)$ to $(t - T)$. This was not true for the original function $f(t)$. Since $q(t)$ is identical to its own time inverse, a convolving correlator simpler and more efficient than that shown in FIG. 2 is possible. This is shown in FIG. 3.

In the FIG. 3 configuration, the parametric region of the convolver must encompass a minimum time interval of $2(T + e)$. This permits all of the transmitted energy to be correlated. This type of implementation is possible only when a function is identical to its time inverse. It is noted that like components of FIGS. 2 and 3 are identified by the identical characters.

What is claimed is:

1. A self synchronizing convolver system comprised of a transmitter, a first antenna associated with said transmitter for transmission of radiant energy therefrom, an even function generator providing a modulating signal to said transmitter, a receiver, a second antenna assoicated with said receiver, said second antenna rceiving resultant radiant energy from the transmission, means to power split the output signal from said receiver into first and second portions, a convolver having first and second inputs and a parametric region, delay means having a preselected delay equal to one-half modulating signal length T, said first portion passing through said delay means to said first input of said convolver and said second portion being fed directly to said second input of said convolver, with the output signal being provided by way of said parametric region.

* * * * *